(12) United States Patent
Tellefsen et al.

(10) Patent No.: US 7,680,686 B2
(45) Date of Patent: Mar. 16, 2010

(54) SYSTEM AND METHODS FOR BUSINESS TO BUSINESS PRICE MODELING USING PRICE CHANGE OPTIMIZATION

(75) Inventors: Jens E. Tellefsen, Mountain View, CA (US); Soulaymane Kachani, New York, NY (US)

(73) Assignee: Vendavo, Inc., Palo Alto, CA (US)

( * ) Notice: Subject to any disclaimer, the term of this patent is extended or adjusted under 35 U.S.C. 154(b) by 243 days.

(21) Appl. No.: 11/468,013

(22) Filed: Aug. 29, 2006

(65) Prior Publication Data

US 2008/0059280 A1     Mar. 6, 2008

(51) Int. Cl.
G06F 17/30 (2006.01)
G06F 17/00 (2006.01)
(52) U.S. Cl. ........................... 705/10; 705/400
(58) Field of Classification Search ............ 705/10, 705/400
See application file for complete search history.

(56) References Cited

U.S. PATENT DOCUMENTS

| | | | |
|---|---|---|---|
| 3,806,711 A | 4/1974 | Cousins, Jr. | |
| 5,053,957 A | 10/1991 | Suzuki | |
| 5,224,034 A | 6/1993 | Katz et al. | |
| 5,461,708 A | 10/1995 | Kahn | |
| 5,497,489 A | 3/1996 | Menne | |
| 5,537,590 A | 7/1996 | Amado | |
| 5,590,269 A | 12/1996 | Kruse et al. | |
| 5,670,984 A | 9/1997 | Robertson et al. | |
| 5,689,287 A | 11/1997 | Mackinlay et al. | |
| 5,710,887 A | 1/1998 | Chelliah et al. | |
| 5,740,448 A | 4/1998 | Gentry et al. | |
| 5,758,327 A | 5/1998 | Gardner et al. | |
| 5,808,894 A | 9/1998 | Wiens et al. | |
| 5,870,717 A | 2/1999 | Wiecha | |
| 5,873,069 A | 2/1999 | Reuhl et al. | |
| 5,878,400 A | 3/1999 | Carter, III | |
| 5,946,666 A | 8/1999 | Nevo et al. | |
| 6,009,407 A | 12/1999 | Garg | |
| 6,075,530 A | 6/2000 | Lucas et al. | |
| 6,078,901 A | 6/2000 | Ching | |
| 6,151,031 A | 11/2000 | Atkins et al. | |

(Continued)

FOREIGN PATENT DOCUMENTS

WO    WO 99/60486    11/1999

(Continued)

OTHER PUBLICATIONS

Bhattacharya, Anindya; Friedman, Hershey H. "Using 'Smart' Pricing to Increase Profits and Maximize Customer Satisfaction". Aug. 2001. The National Public Accountant. vol. 46, Issue 6.*

(Continued)

*Primary Examiner*—Jonathan G. Sterrett
*Assistant Examiner*—Peter Choi
(74) *Attorney, Agent, or Firm*—Kang S. Lim

(57) ABSTRACT

The present invention relates to business to business market price control and management systems. More particularly, the present invention relates to systems and methods for generating price modeling and optimization modules in a business to business market setting wherein price changes are optimized to achieve desired business results.

9 Claims, 11 Drawing Sheets

U.S. PATENT DOCUMENTS

| | | |
|---|---|---|
| 6,211,880 B1 | 4/2001 | Impink, Jr. |
| 6,320,586 B1 | 11/2001 | Plattner et al. |
| 6,434,533 B1 | 8/2002 | Fitzgerald |
| 6,553,350 B2 | 4/2003 | Carter |
| 6,665,577 B2 | 12/2003 | Onyshkevych |
| 6,678,695 B1 | 1/2004 | Bonneau et al. |
| 6,785,664 B2 | 8/2004 | Jameson |
| 6,801,201 B2 | 10/2004 | Escher |
| 6,812,926 B1 | 11/2004 | Rugge |
| 6,851,604 B2 | 2/2005 | Girotto et al. |
| 6,856,967 B1 | 2/2005 | Woolston et al. |
| 6,907,403 B1 * | 6/2005 | Klein et al. ............... 705/36 R |
| 6,988,076 B2 * | 1/2006 | Ouimet ......................... 705/7 |
| 7,015,912 B2 | 3/2006 | Marais |
| 7,046,248 B1 | 5/2006 | Perttunen |
| 7,076,463 B1 | 7/2006 | Boies et al. |
| 7,080,026 B2 | 7/2006 | Singh et al. |
| 7,092,929 B1 | 8/2006 | Dvorak et al. |
| 7,133,848 B2 | 11/2006 | Phillips et al. |
| 7,149,716 B2 | 12/2006 | Gatto |
| 7,155,510 B1 | 12/2006 | Kaplan |
| 7,218,325 B1 | 5/2007 | Buck |
| 7,233,928 B2 | 6/2007 | Huerta et al. |
| 7,254,584 B1 | 8/2007 | Addison, Jr. |
| 7,308,421 B2 | 12/2007 | Raghupathy et al. |
| 7,315,835 B1 | 1/2008 | Takayasu et al. |
| 7,330,839 B2 * | 2/2008 | Srinivasan et al. .......... 705/400 |
| 7,343,355 B2 * | 3/2008 | Ivanov et al. ............... 705/400 |
| 7,360,697 B1 | 4/2008 | Sarkar et al. |
| 2001/0003814 A1 | 6/2001 | Hirayama et al. |
| 2001/0014868 A1 * | 8/2001 | Herz et al. ..................... 705/14 |
| 2002/0007323 A1 | 1/2002 | Tamatsu |
| 2002/0032610 A1 | 3/2002 | Gold et al. |
| 2002/0042782 A1 | 4/2002 | Albazz et al. |
| 2002/0052817 A1 | 5/2002 | Dines et al. |
| 2002/0059229 A1 | 5/2002 | Natsumeda et al. |
| 2002/0072993 A1 | 6/2002 | Sandus et al. |
| 2002/0099596 A1 * | 7/2002 | Geraghty ..................... 705/10 |
| 2002/0107819 A1 | 8/2002 | Ouimet |
| 2002/0116348 A1 * | 8/2002 | Phillips et al. .............. 705/400 |
| 2002/0128953 A1 | 9/2002 | Quallen et al. |
| 2002/0138402 A1 | 9/2002 | Zacharia et al. |
| 2002/0152133 A1 | 10/2002 | King et al. |
| 2002/0152150 A1 | 10/2002 | Cooper et al. |
| 2002/0156695 A1 | 10/2002 | Edwards |
| 2002/0165726 A1 | 11/2002 | Grundfest |
| 2002/0165760 A1 * | 11/2002 | Delurgio et al. ............... 705/10 |
| 2002/0178077 A1 | 11/2002 | Katz et al. |
| 2002/0188576 A1 | 12/2002 | Peterson et al. |
| 2002/0194051 A1 | 12/2002 | Hall et al. |
| 2003/0009411 A1 | 1/2003 | Ram et al. |
| 2003/0028451 A1 | 2/2003 | Ananian |
| 2003/0033240 A1 | 2/2003 | Balson et al. |
| 2003/0095256 A1 | 5/2003 | Cargill et al. |
| 2003/0110066 A1 * | 6/2003 | Walser et al. ................... 705/7 |
| 2003/0115129 A1 | 6/2003 | Feaver et al. |
| 2003/0126053 A1 | 7/2003 | Boswell et al. |
| 2003/0130883 A1 | 7/2003 | Schroeder et al. |
| 2003/0167209 A1 | 9/2003 | Hsieh |
| 2003/0172014 A1 | 9/2003 | Quackenbush et al. |
| 2003/0191723 A1 | 10/2003 | Foretich et al. |
| 2003/0195810 A1 | 10/2003 | Raghupathy et al. |
| 2003/0195832 A1 | 10/2003 | Cao et al. |
| 2003/0200185 A1 | 10/2003 | Huerta et al. |
| 2003/0225593 A1 | 12/2003 | Ternoey et al. |
| 2003/0229552 A1 | 12/2003 | Lebaric et al. |
| 2004/0024715 A1 | 2/2004 | Ouimet |
| 2004/0049470 A1 | 3/2004 | Ouimet |
| 2004/0078288 A1 | 4/2004 | Forbis et al. |
| 2004/0117376 A1 | 6/2004 | Lavin et al. |
| 2004/0128225 A1 | 7/2004 | Thompson et al. |
| 2004/0133526 A1 | 7/2004 | Shmueli et al. |
| 2004/0193442 A1 | 9/2004 | Kimata et al. |
| 2004/0267674 A1 | 12/2004 | Feng et al. |
| 2005/0004819 A1 | 1/2005 | Etzioni et al. |
| 2005/0004832 A1 | 1/2005 | Ostergard et al. |
| 2005/0096963 A1 | 5/2005 | Myr et al. |
| 2005/0197857 A1 | 9/2005 | Avery |
| 2005/0197971 A1 | 9/2005 | Kettner et al. |
| 2005/0256778 A1 * | 11/2005 | Boyd et al. ................... 705/26 |
| 2005/0267831 A1 | 12/2005 | Esary et al. |
| 2005/0278227 A1 | 12/2005 | Esary et al. |
| 2006/0004861 A1 | 1/2006 | Albanese et al. |
| 2006/0031178 A1 | 2/2006 | Lehrman et al. |
| 2006/0031179 A1 | 2/2006 | Lehrman |
| 2006/0047574 A1 | 3/2006 | Sundaram et al. |
| 2006/0069585 A1 | 3/2006 | Springfield et al. |
| 2006/0241923 A1 | 10/2006 | Xu et al. |
| 2007/0294192 A1 | 12/2007 | Tellefsen |

FOREIGN PATENT DOCUMENTS

| | | |
|---|---|---|
| WO | WO 00/29995 | 5/2000 |
| WO | WO 2005/1199500 | 12/2005 |

OTHER PUBLICATIONS

Kim, Byung-Do; Blattberg, Robert C; Rossi, Peter E. "Modeling the Distribution of Price Sensitivity and Implications for Optimal Retail Pricing". Jul. 1995. Journal of Business & Economic Statistics. vol. 13, Issue 3.*

Levy, Michael; Grewal, Dhruv; Kopalle, Praveen K; Hess, James D.; "Emerging Trends in Retail Pricing Practice: Implications for Research". 2004. Journal of Retailing. vol. 80.*

Lucke, Dorothea; Schroder, Philipp J H; Schumacher, Dieter; "A Note on R&D and Price Elasticity of Demand". Nov. 2005. Jahrbucher fur Nationalokonomie und Statistik. vol. 225, Issue 6.*

Hung, Chao-Sun. "Conjectural Variations and Market Performance in a Differentiated Product Industry". Dec. 1991. Atlantic Economic Journal. vol. 19, Issue 4.*

Dawes, John. "Assessing the Impact of a Very Successful Price Promotion on Brand, Category and Competitor Sales". 2004. The Journal of Product and Brand Management. vol. 13, Issue 5.*

Leeflang, Peter S H; Wittink, Dick R. "Marketing Decisions Based on Econometric Models". Spring 2002. Marketing Research. vol. 14, Issue 1.*

Dawes, John. "Price Changes and Defection Levels in a Subscription-Type Market: Can An Estimation Model Really Predict Defection Levels?". 2004. The Journal of Services Marketing. vol. 18, Issue 1.*

Caru, Antonella; Cugini, Antonella. "Profitability and Customer Satisfaction in Services: An Integrated Perspective Between Marketing and Cost Management Analysis". 1999. International Journal of Service Industry Management. vol. 10, Issue 2.*

Tollefson, John O.; Lessig, V. Parker.; "Aggregation Criteria in Normative Market Segmentation Theory". Aug. 1978. Journal of Marketing Research. vol. 15.*

Coulter, Keith S. "Decreasing Price Sensitivity Involving Physical Product Inventory: A Yield Management Application". 2001. The Journal of Product and Brand Management. vol. 10, Issue 5.*

Kirschen, Daniel S.; Strbac, Goran; Cumperayot, Pariya; Mendes, Dilemar de Paiva; "Factoring in the Elasticity of Demand in Electricity Prices". May 2000. IEEE Transactions on Power Systems. pp. 612-617.*

Choi, S. Chan; Desarbo, Wayne S.; Harker, Patrick T. "Product Positioning under Price Competition." Feb. 1990. Management Science. Volume 36, Issue 2. pp. 175-199.*

"PCT International Search Report and the Written Opinion of the International Searching Authority", Application No. PCT/US 07/23740, mailed Mar. 3, 2008.

Beidl, Richard et al., "The Coming of Risk-Based Pricing: Part Two", Oct. 2000, Mortgage Banking, Washington, vol. 61, Issue 1.

"eMerchant, magic Software's Powerful New Business-to-Business E-commerce Solution. Wins 'Best of Show' at Internet Commerce Expo", Apr. 1, 1999, Business Wire, (2 pages).

Bourne, Humphrey, "Pricing the Strategic Implications", Mar. 1999, Management Accounting. Magazine for Chartered Management Accountants; vol. 77, Issue 3.

"PCT International Search Report", Application No. PCT/US07/10754, mailed Nov. 7, 2007.

"PCT International Search Report", Application No. PCT/US07/11571, mailed Jan. 7, 2008.

"PCT International Search Report", Application No. PCT/US05/14879, mailed Apr. 16, 2007.

"Written Opinion of the International Searching Authority", Application No. PCT/US05/14879, mailed Apr. 16, 2007.

"Written Opinion of the International Searching Authority", Application No. PCT/US05/14981, mailed Nov. 27, 2006.

"Written Opinion of the International Searching Authority", Application No. PCT/US05/14883, mailed Oct. 3, 2006.

Origin 7.0 Help (including 21 sheets of screen shots), 2000.

Microsoft Excel 2000, 1985-1999.

Marn, Michael V. and Robert L. Rosiello, "Managing Price, Gaining Profit," Harvard Business Review, pp. 84-93 (Sep.-Oct. 1992).

"Net Commerce Launches Its FastTrack Configurator and FasPac Catalog Utility", Apr. 17, 2001, Business Wire. New York. p. 1.

"SPEX Assesses B2C and B2B Electronic Commerce Software Maturity", PR Newswire. New York: p. 1.

Murphy, Diane R., "The Exciting Role of the Credit Manager in the Expanding E-Commerce Marketplace", Business Credit, vol. 10, No. 9, p. 64, Oct. 2000.

Spanbauer, Scott et al., "You've got E-mail", PC World, vol. 16, No. 6, p. 135, Jun. 1998.

Walker, Kenton B. et al., "Planning a Revenue Stream System in an E-Business Environment", 2001, Industrial Management—Data Systems, p. 406-413, 8/9;ABI/INFORM Global.

"PCT International Search Report and the Written Opinion of the International Searching Authority", Application No. PCT/US07/18663, mailed Aug. 26, 2008.

Mills, Don, "Oil Rises on Report Showing Gasoline Supply Decline", National Post, Ont; May 30, 2003.

Keenan, Faith, "The Price is Really Right," Business Week, Mar. 31, 2003.

Chan Choi, S., Desarbo, W. S., Harker, P. T. "Product Positioning under Price Competition." Feb. 1990. Management Science, vol. 36, Issue 2, pp. 175-199.

Kirschen, D. S., Strbac, G., Cumperayot, P., de Paiva Mendes, D. "Factoring the Elasticity of Demand in Electricity Prices." May 2000. IEEE Transactions on Power Systems, vol. 15, No. 2, pp. 612-617.

* cited by examiner

SYSTEM AND METHODS FOR BUSINESS TO BUSINESS PRICE MODELING USING PRICE CHANGE OPTIMIZATION

BACKGROUND OF THE INVENTION

The present invention relates to business to business market price control and management systems. More particularly, the present invention relates to systems and methods for optimizing prices in a business to business market setting wherein an optimal price change is determined according to business strategy and objectives.

There are major challenges in business to business (hereinafter "B2B") markets which hinder the effectiveness of classical approaches to price optimization.

For instance, in B2B markets, a small number of customers represent the lion's share of the business. Managing the prices of these key customers is where most of the pricing opportunity lies. Also, B2B markets are renowned for being data-poor environments. Availability of large sets of accurate and complete historical sales data is scarce.

Furthermore, B2B markets are characterized by deal negotiations instead of non-negotiated sale prices (prevalent in business to consumer markets). There is no existing literature on optimization of negotiation terms and processes, neither at the product/segment level nor at the customer level.

Finally, B2B environments suffer from poor customer segmentation. Top-down price segmentation approaches are rarely the answer. Historical sales usually exhibit minor price changes for each customer. Furthermore, price bands within customer segments are often too large and customer behavior within each segment is non-homogeneous.

Product or segment price optimization relies heavily on the quality of the customer segmentation and the availability of accurate and complete sales data. In this context, price optimization makes sense only (i) when price behavior within each customer segment is homogeneous and (ii) in the presence of data-rich environments where companies sales data and their competitors' prices are readily available. These conditions are met almost exclusively in business to consumer (hereinafter "B2C") markets such as retail, and are rarely encountered in B2B markets.

On the other hand, customer price optimization relies heavily on the abundance of data regarding customers' past behavior and experience, including win/loss data and customer price sensitivity. Financial institutions have successfully applied customer price optimization in attributing and setting interest rates for credit lines, mortgages and credit cards. Here again, the aforementioned condition is met almost exclusively in B2C markets.

There are three major types of price optimization solutions in the B2B marketplace: revenue/yield management, price testing and highly customized optimization solutions.

Revenue/yield management approaches were initially developed in the airline context, and were later expanded to other applications such as hotel revenue management, car rentals, cruises and some telecom applications (e.g. bandwidth pricing). These approaches are exclusively concerned with perishable products (e.g. airline seats) and are not pricing optimization approaches per se Price testing approaches attempt to learn and model customer behavior dynamically by measuring customer reaction to price changes. While this approach has been applied rather successfully in B2C markets, where the benefits of price optimization outweigh the loss of a few customers, its application to B2B markets is questionable. No meaningful customer behavior can be modeled without sizable changes in customer prices (both price increases and decreases). In B2B markets, where a small fraction of customers represent a substantial fraction of the overall business, these sizable price-changing tests can have adverse impact on business. High prices can drive large customers away with potentially a significant loss of volume. Low prices on the other hand, even for short periods of time, can dramatically impact customer behavior, increase customers' price sensitivities and trigger a more strategic approach to purchasing from the customers' side.

Finally, in B2B markets, highly customized price optimization solutions have been proposed. These solutions have had mixed results. These highly customized price optimization solutions require significant consulting effort in order to address companies' unique situations including cost structure, customer and competitor behavior, and to develop optimization methods that are tailored to the type of pricing data that is available. Most of the suggested price changes from these solutions are not implemented. Even when they are implemented, these price changes tend not to stick. Furthermore, the maintenance of such pricing solutions usually requires a lot of effort. This effort includes substantial and expensive on-going consulting engagements with the pricing companies.

These solutions have failed primarily because of the lack of reliable price control and management systems. In fact, in B2B markets, reliable price control and management systems may be significantly more complex and more important than price optimization modules.

There remains a need for effective price control and management systems coupled with straightforward price optimization modules which can perform price changes in an effective manner, and can measure the performance of these price changes across the sales and marketing organizations, and across product and customer segments, both for existing business (repeat business) and new business.

Furthermore, instead of developing highly customized company-specific price optimization solutions, there remains a need for scalable and customizable price optimization solutions that vary by industry vertical.

Price control and management systems are employed in business in an effort to gain efficiencies and increase margin. Businesses employ a myriad of enterprise resource planning tools in order to manage and control pricing processes.

In particular, in the context of business to business markets, effective price modeling and optimization schemes have been elusive given the scarcity of sales data and the relatively small pool of available customers. In this environment, it is important to include all available relevant data, including competitive behavior data, in order to develop robust price modeling and optimization schemes. It is also important to continuously loop back to update and calibrate the price modeling and optimization schemes with new sales data generated from deals consummated with the benefit of the instant price modeling and optimization schemes.

As such, methods for generating effective business to business price optimization modules, as well as systems and methods for incorporating business to business price modeling and optimization modules into an integrated price control and management system in order to optimize a selected business objective, may be desirable to achieve system-wide price management efficiency.

In view of the foregoing, Systems and Methods For Business to Business Price Modeling Using Continuous Learning and Calibration are disclosed.

SUMMARY OF THE INVENTION

The present invention discloses business to business market price control and management systems. More particularly, the present invention teaches systems and methods for optimizing and modeling prices in a business to business market setting wherein continuous pricing feedback is used to update and calibrate said optimization.

In one embodiment, the method comprises generating a preferred set of prices by selecting a product in a selected market segment, providing sales data corresponding to said product, generating a demand model for said at least one product utilizing said sales data, and generating the preferred set of prices utilizing a price elasticity demand model.

The method also provides for using deal history data to generate a win probability model, and using said win probability model in conjunction with said price elasticity demand model in generating said preferred set of prices.

In another embodiment, the method comprises providing competitive behavior data and generating a competitive behavior model utilizing a Nash equilibrium computation, wherein said competitive behavior model is used in generating said preferred set of prices.

The method further contemplates providing price guidance data for the product, generating a preferred set of guidance prices utilizing the price guidance data, and reconciling the preferred set of prices with the preferred set of guidance prices to generate a reconciled set of prices.

It is further contemplated by the instant method that market segmentation is optimized and that the selected market segment is selected from a preferred set of market segments.

In another embodiment, the instant method includes providing a set of goals and constraints wherein the preferred set of prices is generated to meet the goals and constraints. The method then provides the set of preferred prices to a price control and management system, and generates a quotation utilizing the price control and management system such that the set of preferred prices is incorporated into the quotation.

The method of the instant invention also provides that the set of preferred prices may be overridden by user input. The user may then generate a deal utilizing the price control and management system wherein the deal includes a set of final prices. The set of final prices are used to calibrate the demand model, the win probability model, and the competitive behavior model.

Note that the various features of the present invention described above can be practiced alone or in combination. These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENTS

The present invention will now be described in detail with reference to selected preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. The features and advantages of the present invention may be better understood with reference to the drawings and discussions that follow.

I. Overall System

Figure 1:
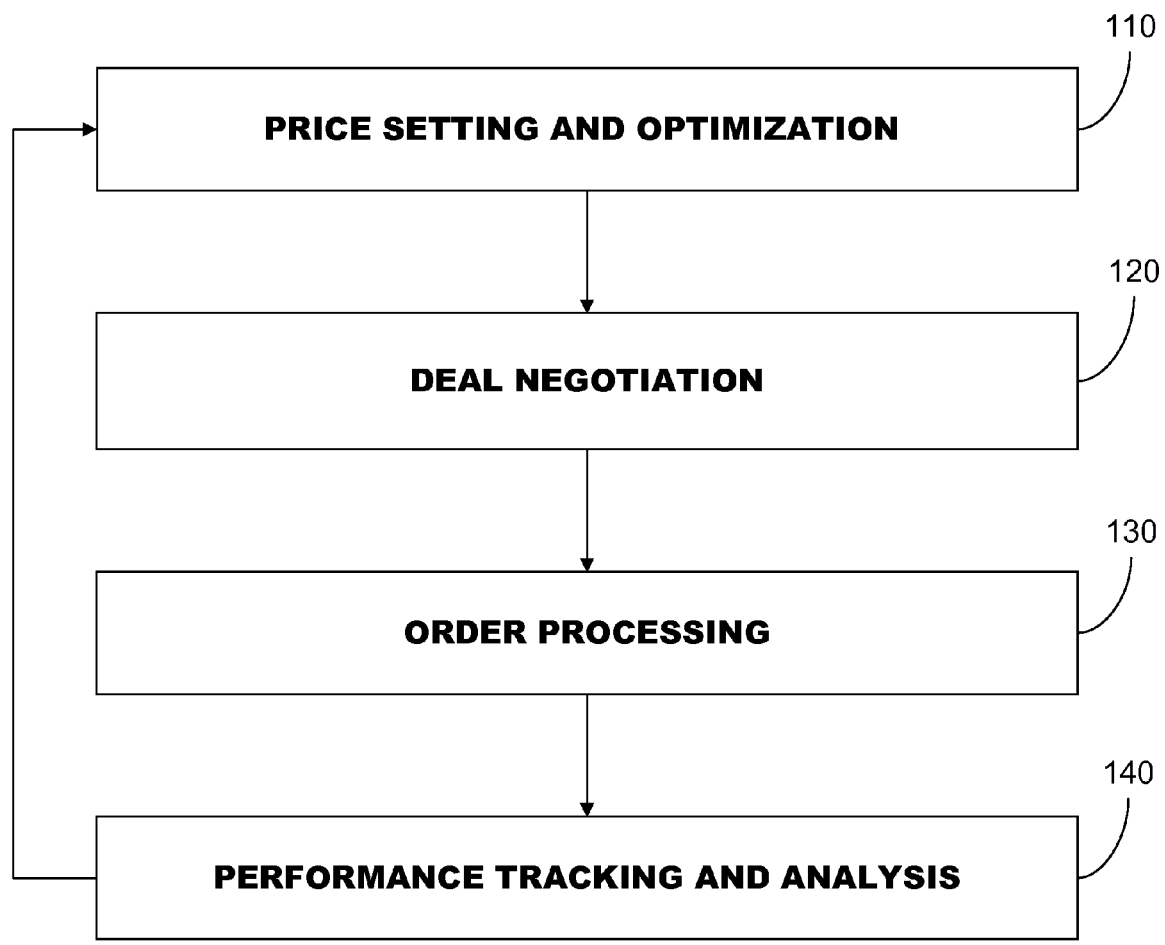
FIG. 1 is a simple graphical representation of an integrated price management system in accordance with an embodiment of the present invention.

To facilitate discussion, FIG. 1 is a high level graphical representation of a business to business price control and management system according to an embodiment of the present invention. A framework for comprehensive price optimization along the operational or product segment level of pricing is presented. The instant price optimization system 100 comprises a sales history database 110, a demand modeling module 120, a optimization module 130, a deal manager module 140, and a learning and calibration module 150. Historical sales data is used by the demand modeling module 120 to model demand for a selected product/segment. The demand modeling module 120 is connected to the optimization module 130. The optimization module 130 uses the demand models provided in generating a set of preferred prices for the selected product/segment. The optimization module 130 is connected to the deal manager module 140, where the preferred prices may be used by a sales force in negotiating deals with customers.

A learning and calibration module 150 is connected to each of the demand modeling module 120, the optimization module 130, and the deal manager module 140. Information from the deal manager module 140 may be used by the learning and calibration module 150 to update and calibrate the demand modeling and price optimization processes.

II. Demand Modeling Module

Figure 2:
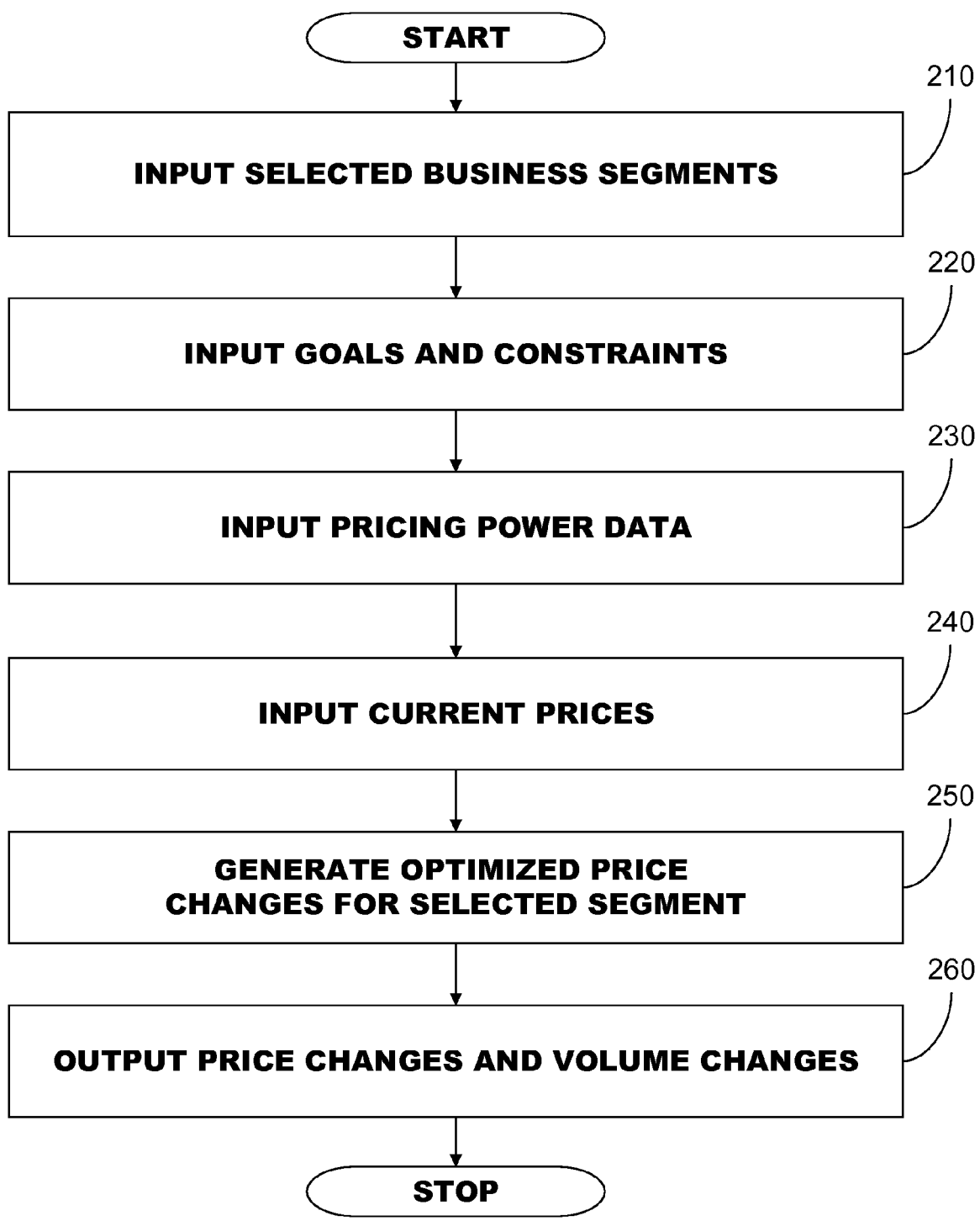
FIG. 2 is a process flowchart illustrating a method for performing price change optimization in accordance with an embodiment of the present invention.

FIG. 2 is a high level flow chart further illustrative of the demand modeling module 120 of FIG. 1. The operation of the demand modeling module 120 will be discussed in general here and in more detail below in the discussion of FIGS. 3, 4, 5 and 6. Preferably, before modeling demand for a particular product/segment, the business segment must first be selected at 210. Sales history data for the selected product/segment is provided at 220. Preferably, win/loss classification data, which defines a deal as a win or a loss based on comparison to the selected industry segment average net margin for the selected product/segment, is provided at 230. Both, the sales history data and the win/loss classification data are used to model demand at 240.

Figure 3:
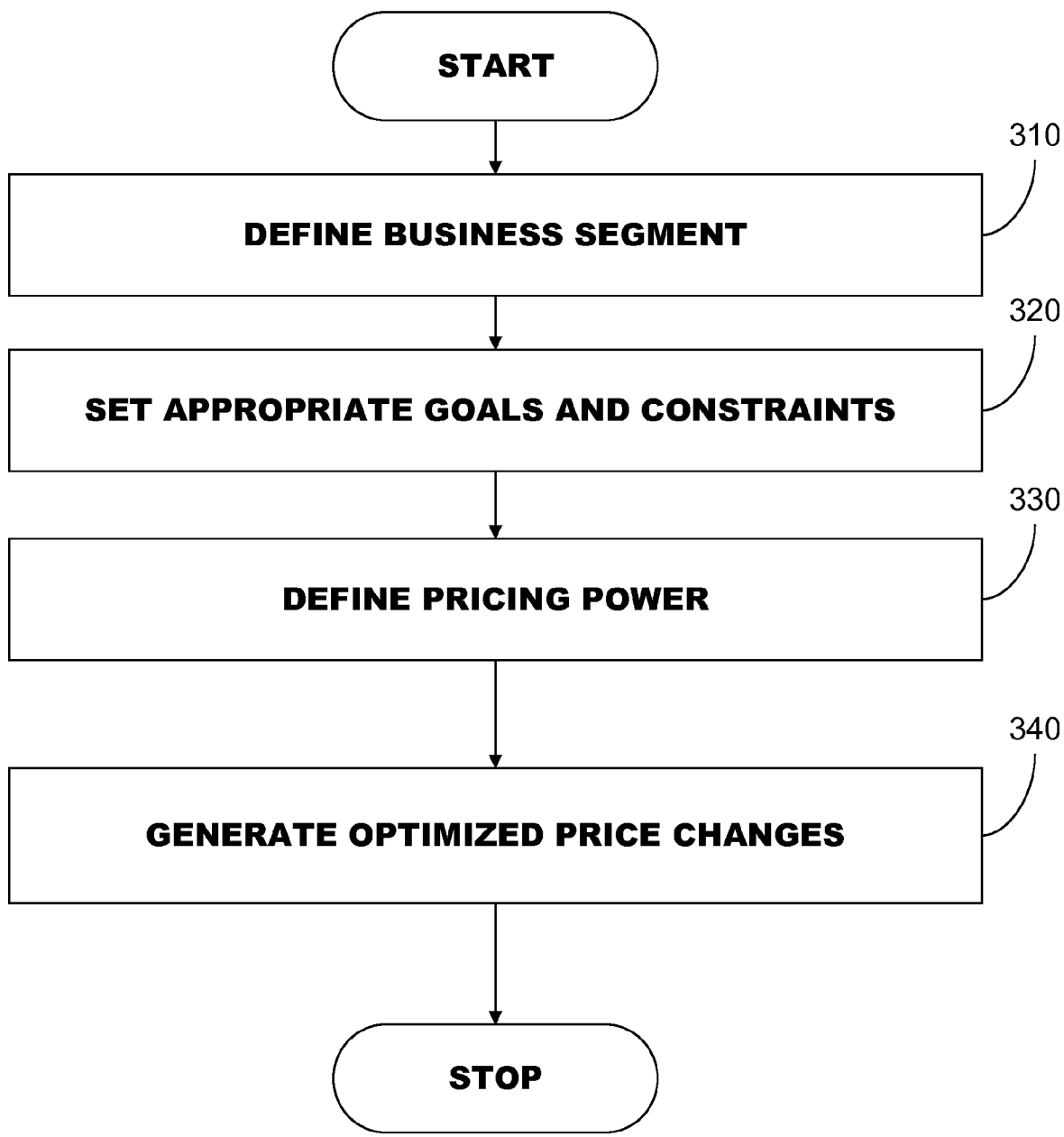
FIG. 3 is a flowchart illustrating an overview of a method for generating optimized price changes in accordance with an embodiment of the present invention.

FIG. 3 is a more detailed flow chart further illustrating the business segment selection step 210 of FIG. 2. The effectiveness of both the demand modeling and price optimization for the selected segment is dependent upon proper segmentation. Segmentation is defined so as to group products and customers which can be expected to have sufficiently similar characteristics.

Business segments can be static (non-changing) or dynamic (changing over time). Examples of static business segments include: Product segments: Product Family, Product Group, Product Type (e.g. Commodity, Specialty, Competitive), Product Use (e.g. Core Products, Add-on Products, Maintenance Products); Customer segments: Customer Geography, Customer Region, Customer Industry, Customer Size, Customer Relationship (e.g. Primary provider, Spot Purchase, Competitive). Examples of dynamic business segments include: Product segments: Product Lifecycle (New, Growing, Mature, End-of-life), Product Yearly Revenue Contribution (A=Top 30% of total revenue, B=Next 30%, C=Bottom 40%), Product Yearly Profit Contribution, Customer segments: Customer Yearly Revenue Contribution, Customer Yearly Profit Contribution, Customer Product Purchase Compliance (customers who orders less than certain percent of quoted products), Order Compliance (customers who orders less than committed volumes from quote or contract), Payment Compliance (customers who pays their invoices outside of pre-agreed payment terms defined in quote or contract).

Preferably, once the initial business segmentation has been accomplished, the segmentation is optimized at 320, giving a preferred business segmentation structure. An optimized business segmentation structure gives the advantage of enabling the generation of more precise product/segment demand models.

Once segment optimization is completed at step 320, business segments relevant to the particular products/segments in question may be selected at step 330.

Figure 4:
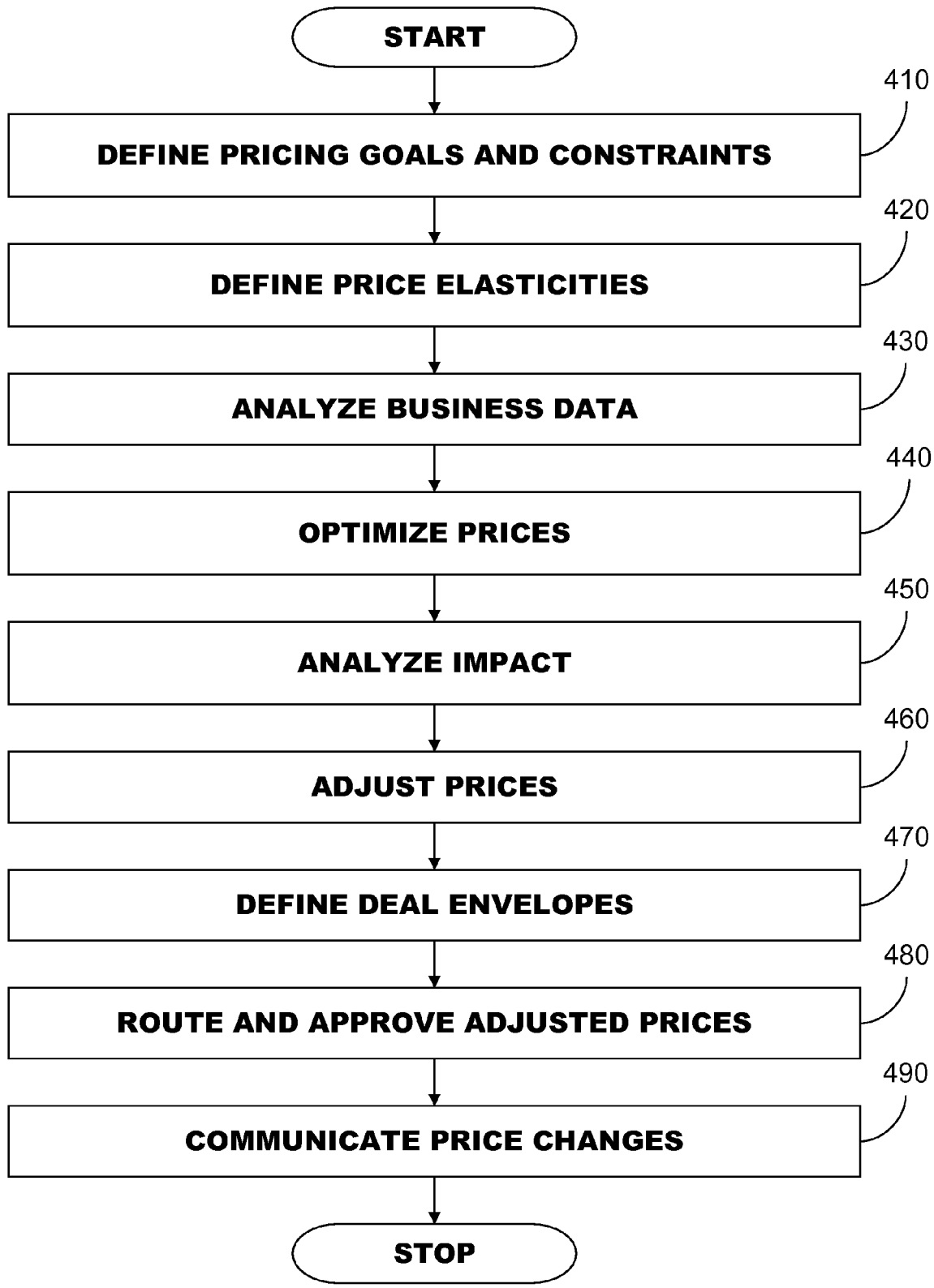
FIG. 4 is a flowchart illustrating a method for integrating optimized price changes in accordance with an embodiment of the instant invention.

FIG. 4 is a flow chart further illustrating step 220 of FIG. 2. In step 220, raw product/segment sales history data is provided so that product/segment demand models may be generated. FIG. 4 illustrates a method of taking raw product/segment sales data and cleansing the raw data to produce a cleansed sales dataset.

The process of dataset creation and cleaning begins by inputting raw order history data at step 410. The raw data is then subjected to cleansing at step 420. Data cleansing includes things like removing transactional outliers (e.g. sales dollars of zero or order or magnitude higher than the average), removing transactions with inconsistent data (e.g. order quantity of zero), supplementing missing data with derived data (e.g. missing region data=default region), etc. The cleansed order history dataset is then output at step 430. The cleansed dataset is used in generating a demand model at step 240.

Figure 5:
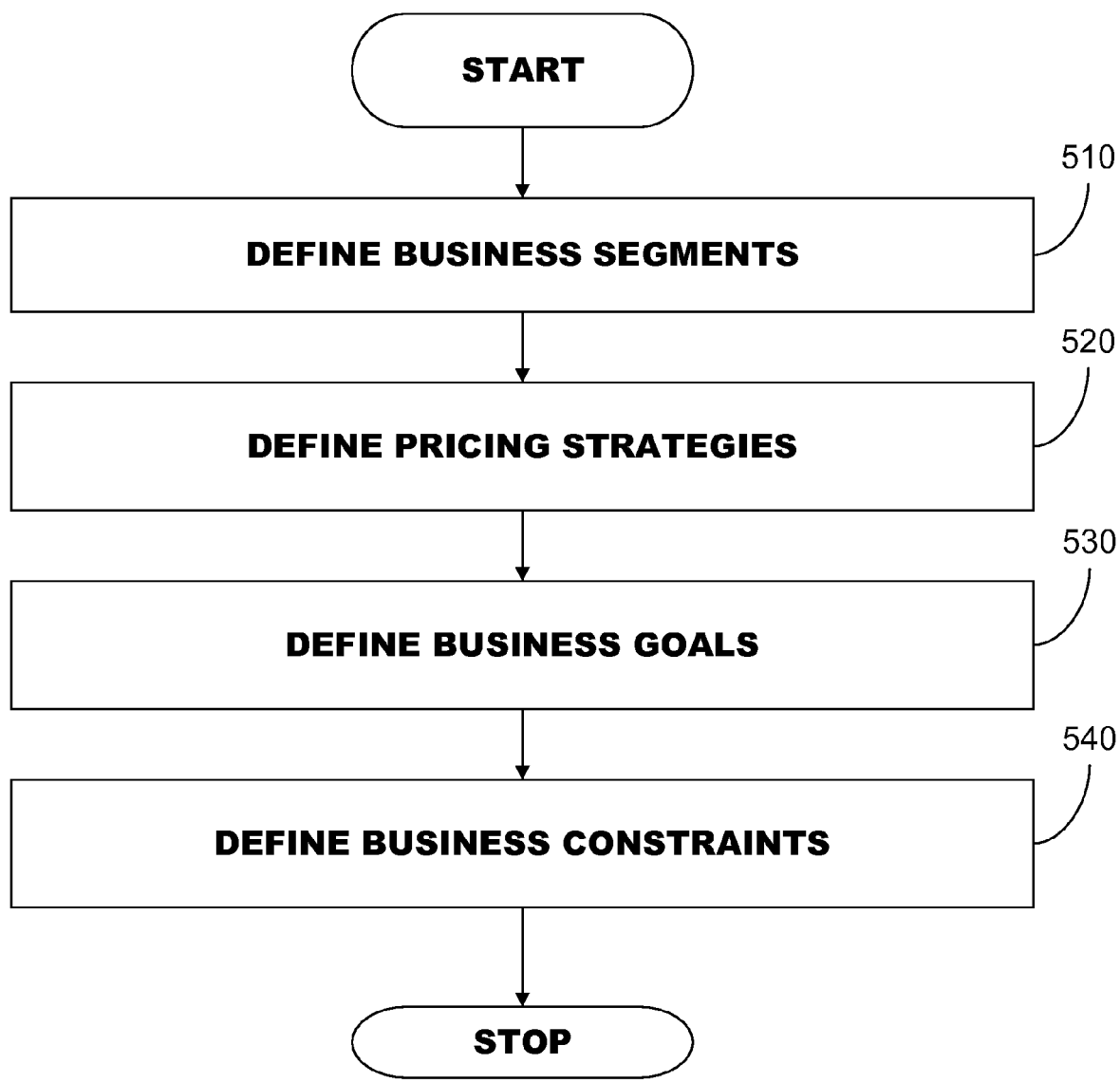
FIG. 5 is flowchart illustrating a method for defining pricing strategy, goals and constraints in accordance with an embodiment of the present invention.

FIG. 5 is a flow chart further illustrating step 230 of FIG. 2. In step 230, win/loss classification data is provided. In order to effectively classify deals, raw deal history data is provided so that product/segment win probability models for the particular product/segment in question may be generated.

Similar to the data cleansing step discussed above, FIG. 5 illustrates a method of taking both, raw order history data provided at step 510, and raw product/segment deal history data at step 520, and cleansing the raw data to produce a cleansed order and deal history dataset at step 530. The cleansed order and deal history dataset is used to generate deal win/loss parameters at step 540.

Deals are classified as wins or losses based upon a comparison between deal transactions (quotes and/or contracts) and order transactions. The matching logic compares things like deal effective date (from and to date), specific product or product group, customer account, ship-to or billed-to. Deal win/loss classification data is output at step 550 and used to help model demand in step 240.

In a preferred embodiment, demand for a particular product/segment is estimated using the cleansed datasets discussed above to generate a price elasticity demand model and a win probability model. A set of five externally derived, multivariate, parametric, non-separable algorithms is used to create the price elasticity and win probability models.

The "first optimization model" use the following factors: business segments to use, which algorithm to use or best fit, which runs all of them and selects the best one, i.e. the one that has the highest statistical significance vis-à-vis the cleansed data set)

Output from the demand model to the optimization model is a set of price elasticity curves and optionally a set of win probability curves.

Figure 6:
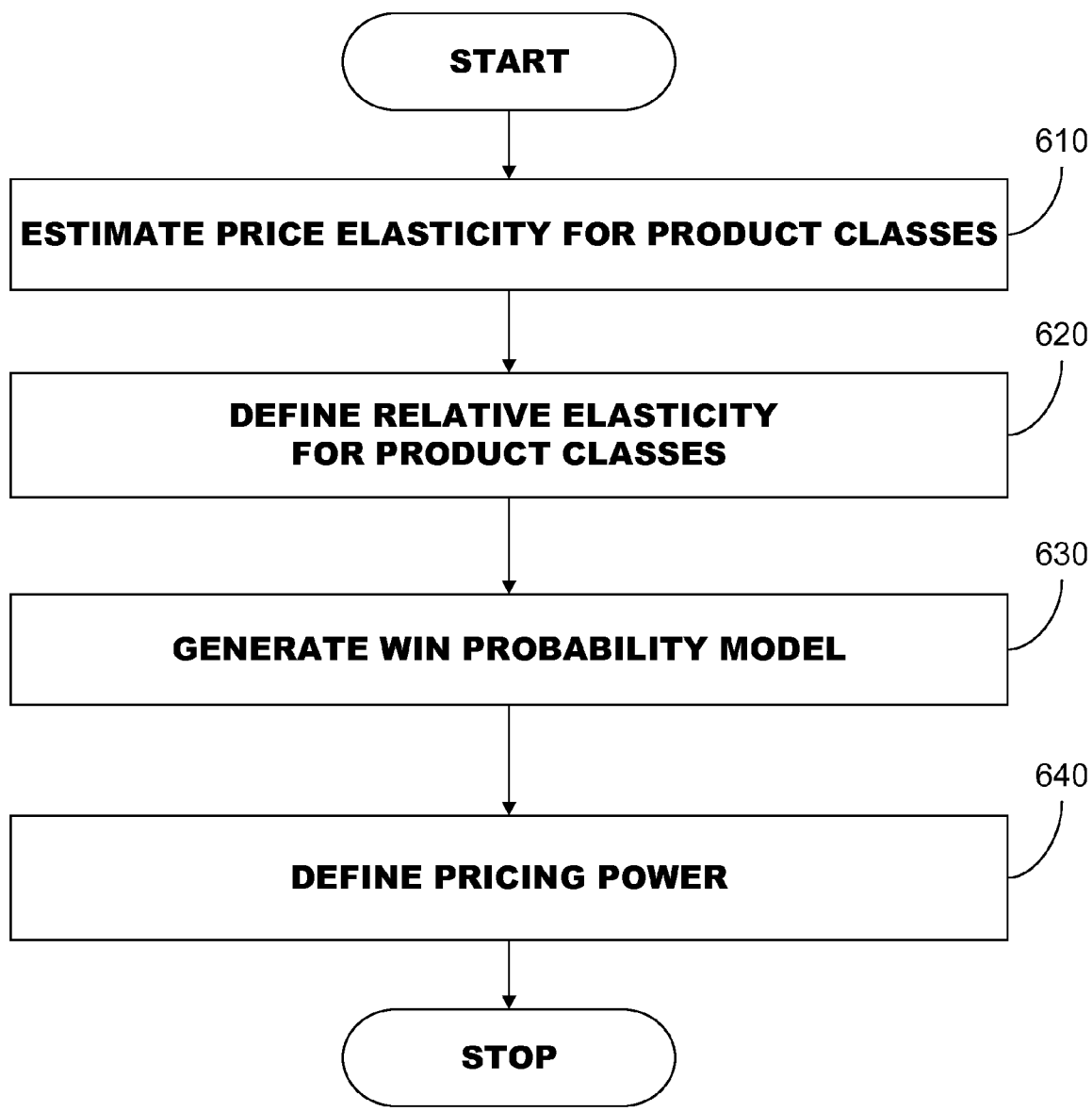
FIG. 6 is a flowchart illustrating a method for defining pricing power in accordance with an embodiment of the present invention.

FIG. 6 is a flowchart illustrating a process for generating the price elasticity and win probability models. Cleansed order history data is input at step 610. Win/loss classification data is provided at step 620. By using the algorithms described above, first a win probability model is generated at step 630. Next, a price elasticity model is generated at step 640. The combine models are used to generate a demand model at step 650. The models are output to the price optimization module at step 660.

III. Price Optimization Module

Figure 7:
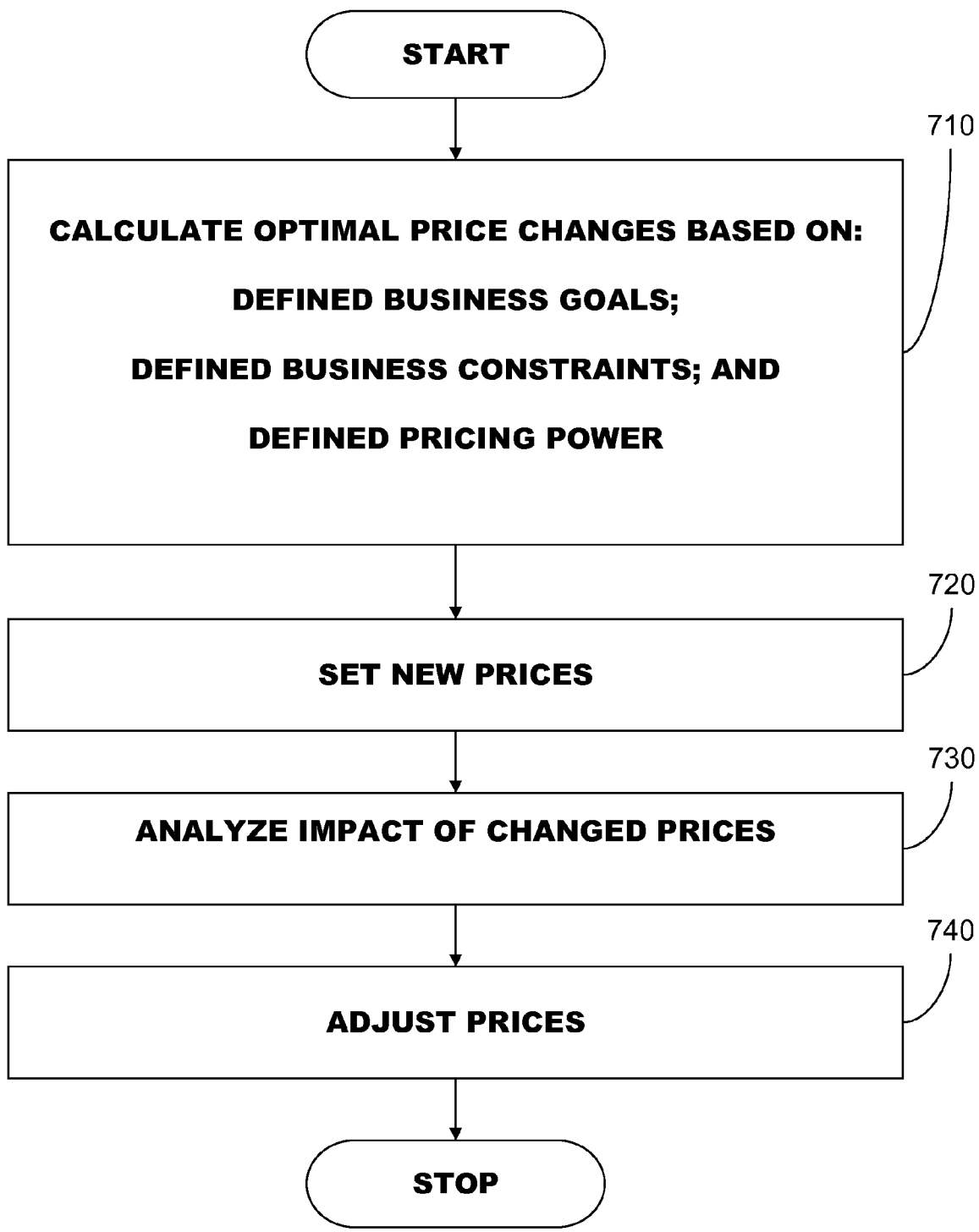
FIG. 7 is a flowchart illustrating a method for setting and adjusting prices based on optimized price changes in accordance with an embodiment of the instant invention.

FIG. 7 is a high level flowchart further illustrating the optimization module 130 of FIG. 1, in accordance with an embodiment of the present invention. The optimization model will be discussed generally here with a more detailed discussion of the various components to follow.

Demand model information is provided from step 660. Preferably, in order to effectively optimize prices in a data-poor B2B setting, competitive behavior data is incorporated into the price optimization scheme. Competitive behavior is provided at step 710.

It is also important to provide optimization goals and constraints in any optimization scheme. The user may decide to optimize for profit, sales or volume maximization goal. Once the optimization goal is selected, optimization constraints can be set. The user may set the constraints in conformance with the particular business objective.

The user may choose to constrain the following factors: maximum price increase, maximum price decrease for a business segment (e.g. Product Yearly Revenue Segment A) or intersection of business segments (e.g. Product Yearly Revenue Segment A and Biotech Industry Customers).

Optimization goals and constraints are provided at step 720. Competitive behavior data along with selected optimization goals and constraints are used to optimize prices at step 730. Previously generated and optimized pricing guidance is provided at step 740. The optimized prices are reconciled with the optimized pricing guidance at step 750. Reconciliation data is provided both to the price optimization step 730 and to the Deal Manager module 140.

Figure 8:
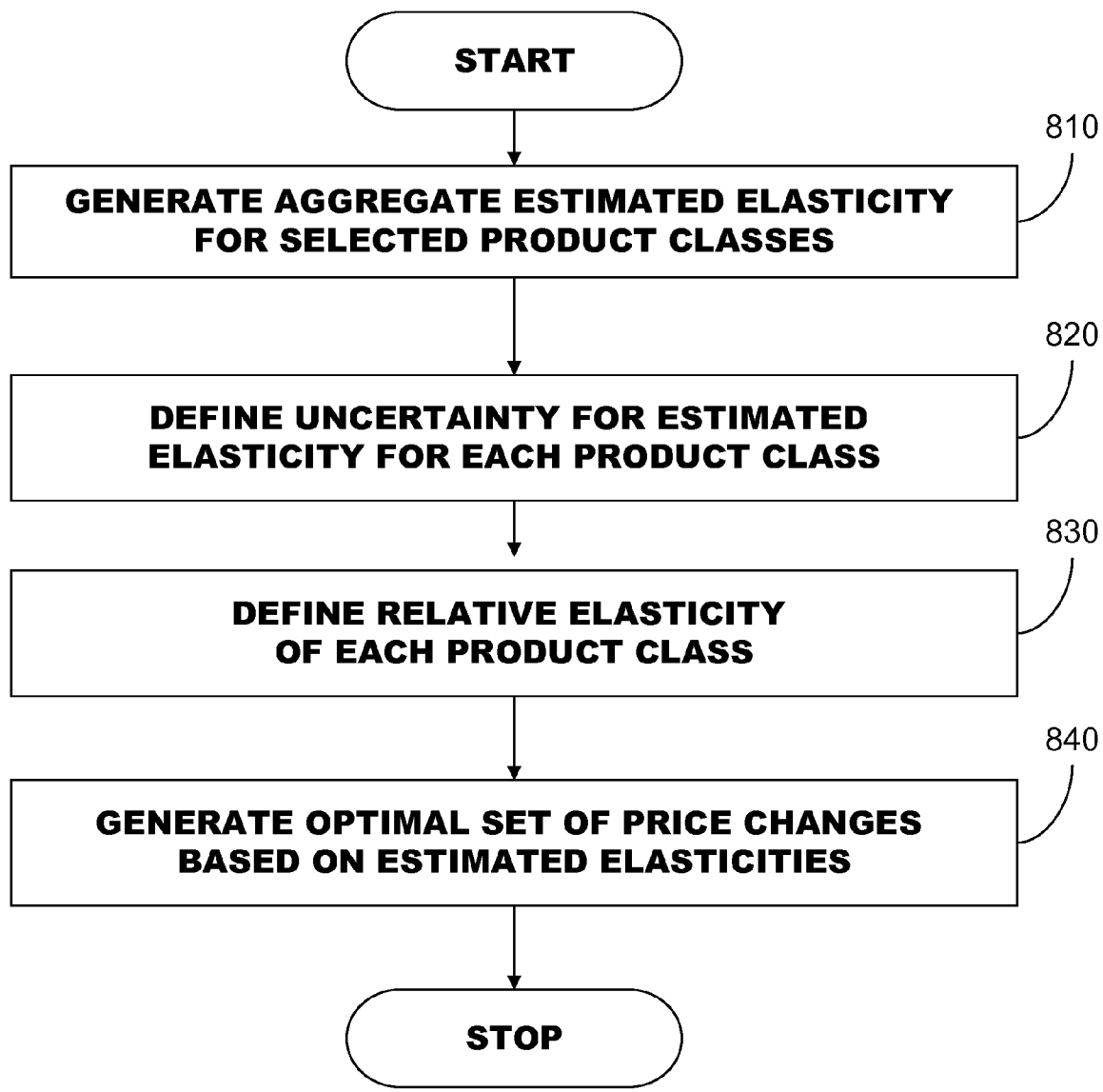
FIG. 8 is a flowchart illustrating a method for generating optimal price changes using estimated relative elasticities in accordance with an embodiment of the instant invention.

FIG. 8 is a more detailed flowchart illustrating the price optimization step 730 of FIG. 7, in accordance with an embodiment of the present invention. Demand model data is provided from the demand modeling module 120 at step 810. Competitive behavior data and optimization goals and constraints are provided at steps 820 and 830, respectively. Prices are optimized to meet the selected goals and constraints at step 840 (this will be discussed in more detail, below). Finally, optimized prices are output for reconciliation at step 850. As discussed above, reconcile prices from step 750 may be provided back to step 840 for iterative optimization.

Figure 9:
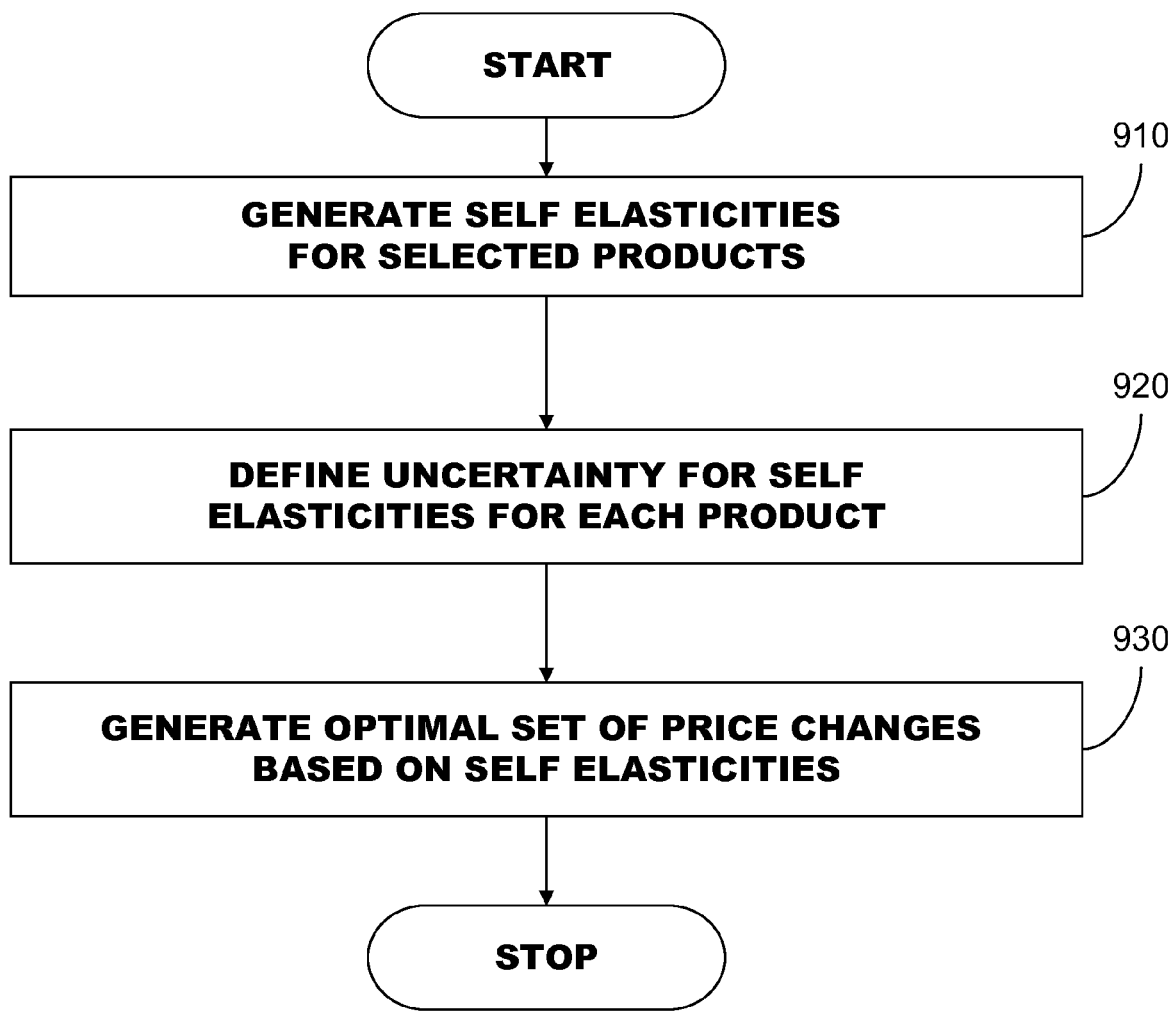
FIG. 9 is a flowchart illustrating a method for generating optimal price changes using self elasticities in accordance with an embodiment of the instant invention.
Figure 10:
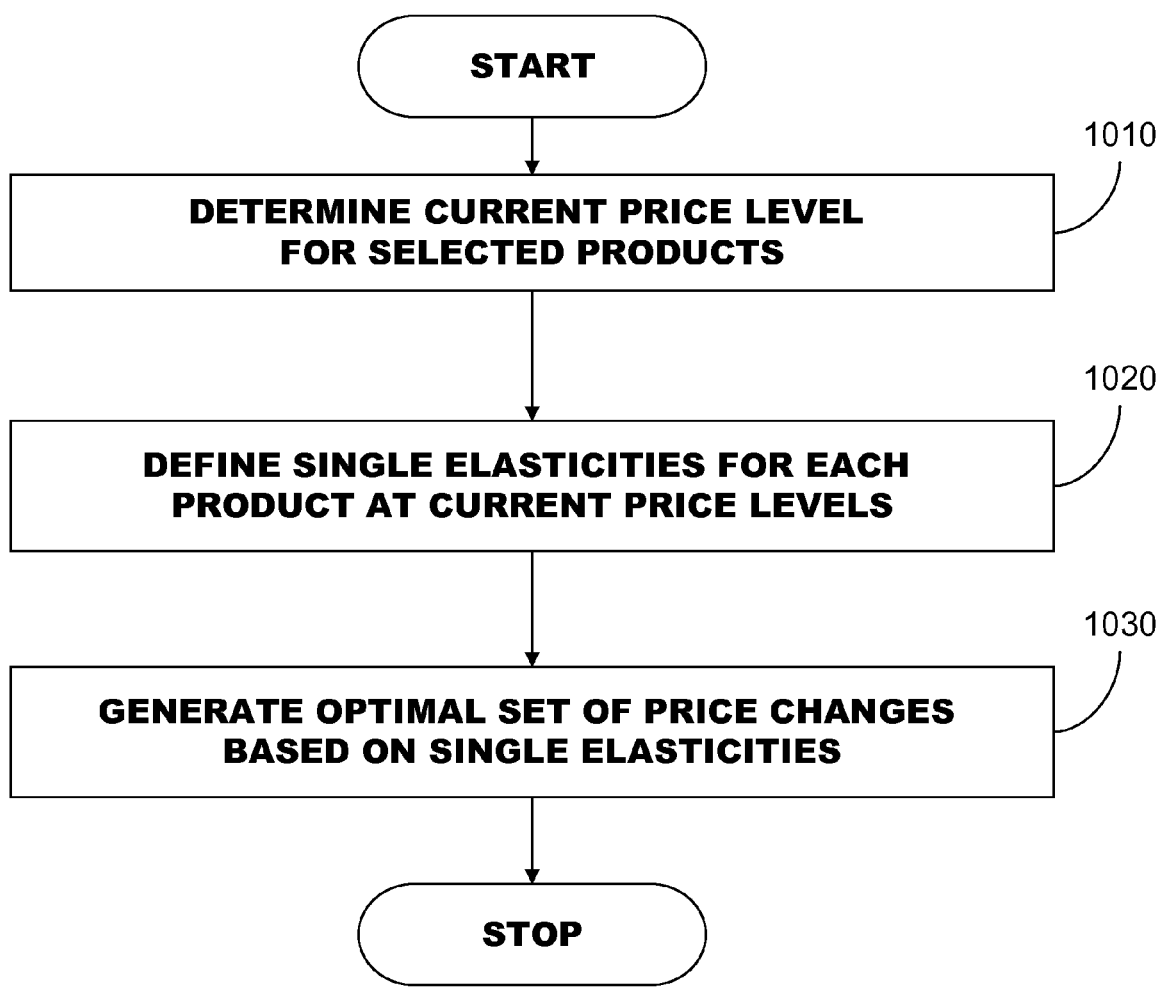
FIG. 10 is a flowchart illustrating a method for generating optimal price changes using single elasticities in accordance with an embodiment of the instant invention.
Figure 11:
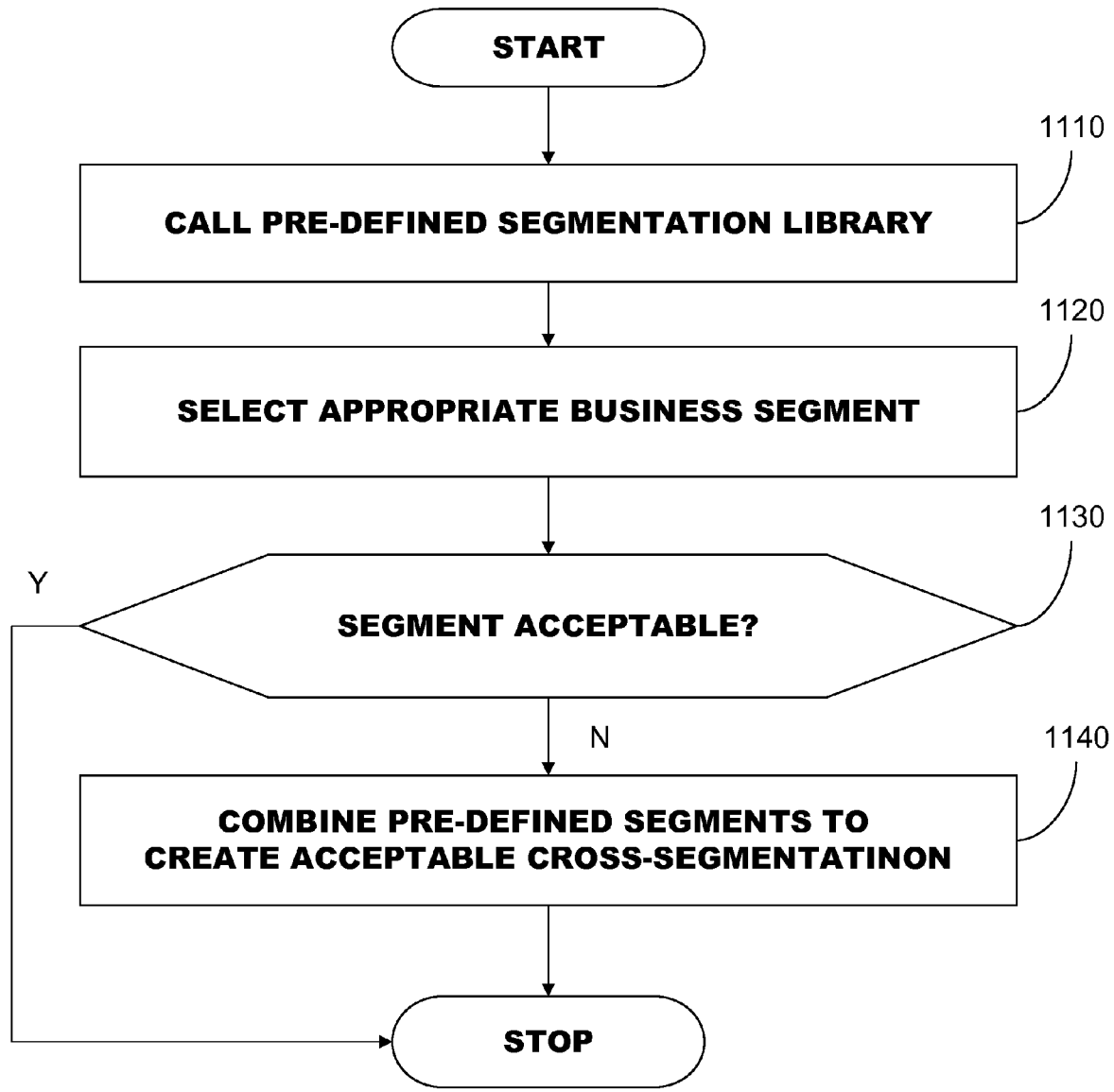
FIG. 11 is a flowchart illustrating a method for creating cross-segments from a library of pre-defined business segments in accordance with an embodiment of the instant invention.

FIG. 9 is a more detailed flowchart further illustrating the optimization step 840 of FIG. 8. Once competitive behavior data and optimization goals and constraints are provided, prices may be optimized for the particular product/segment in question. First, competitive behavior is modeled at step 910 using fictitious play and Nash equilibrium computation. Accurate prediction of competitive behavior is especially important in a B2B environment given the relatively small number of major customers.

Next, at step 920, a dynamic, non-linear optimization is conducted using an iterative relaxation algorithm. The Nash equilibrium computation is combined with the non-linear optimization to achieve the desired result. Optimized prices are output at step 930

While this invention has been described in terms of several preferred embodiments, there are alterations, permutations, modifications and various substitute equivalents, which fall within the scope of this invention. It should also be noted that there are many alternative ways of implementing the methods and systems of the present invention. It is therefore intended that the following appended claims be interpreted as including all such alterations, permutations, modifications, and various substitute equivalents as fall within the true spirit and scope of the present invention. In addition, the use of subtitles in this application is for clarity only and should not be construed as limiting in any way.

What is claimed is:

1. A method for determining an optimal set of price changes in an integrated price management system, said method comprising:

setting an optimization goal, said goal maximizing profit, sales or volume;

defining pricing goals and constraints based on said optimization goal, wherein the constraints may be selected from the group of: a maximum price increase, maximum price decrease for a business segment, or intersection of business segments;

defining a selected business segment, wherein the selected business segment may be at least one of static and dynamic, and wherein the defining the selected business segment includes accessing a pre-defined segmentation library, selecting one or more appropriate pre-defined business segments from the pre-defined segmentation library, and combining the selected one or more appropriate pre-defined business segments to generate the selected business segment;

defining a selected product combination;

receiving, from a database, sales history data and win/loss classification data for the selected product combination;

generating, by a computer, a price elasticity demand model and a win probability model for the selected product combination using the sales history data and win/loss classification data, wherein the price elasticity demand model and the win probability model are generated using a set of multivariate, parametric, non-separable algorithms;

wherein the price elasticity demand model is generated by:
defining an aggregate elasticity range for said selected business segment;
defining a self elasticity for selected products in said selected product combination;
determining a set of current prices for said product combination; and
defining a single elasticity for each product in said selected product combination, wherein said single elasticity is defined at said current price;

generating, by a computer, optimized price changes for said selected product combination and business segment using the price elasticity demand model and the win probability model, wherein the optimized price changes meet the defined pricing goals and constraints; and outputting the optimized price changes to a deal manager for deal negotiations.

2. The method of claim 1 further comprising:
selecting an existing customer;
generating said optimized price changes for said selected product combination for said existing customer.

3. The method of claim 2 further wherein said elasticity range is an estimate.

4. The method of claim 3 further comprising:
using said estimated elasticity to optimize price changes;
analyzing the impact of the optimized price changes;
adjusting optimized prices consistent with business goals; and
setting adjusted prices as optimized prices.

5. A method for determining an optimal set of price changes in an integrated price management system, said method comprising:

setting an optimization goal, said goal maximizing profit, sales or volume;

defining pricing goals and constraints based on said optimization goal, wherein the constraints may be selected from the group of: a maximum price increase, maximum price decrease for a business segment, or intersection of business segments;

defining a plurality of selected business segments, wherein the selected business segments may be at least one of static and dynamic, and wherein the defining the selected business segment includes accessing a pre-defined segmentation library, selecting one or more appropriate pre-defined business segments from the pre-defined segmentation library, and combining the selected one or more appropriate pre-defined business segments to generate the selected business segments;

defining a plurality of selected product combinations;

generating multiple simultaneous segmentation from said selected business segments;

receiving, from a database, sales history data and win/loss classification data for the selected product combination;

generating, by a computer, a price elasticity demand model and a win probability model for the selected product combination using the sales history data and win/loss classification data, wherein the price elasticity demand model and the win probability model are generated using a set of multivariate, parametric, non-separable algorithms;

wherein the price elasticity demand model is generated by:
  defining an aggregate elasticity range for said selected business segment;
  defining a self elasticity for selected products in said selected product combination;
  determining a set of current prices for said product combination; and
  defining a single elasticity for each product in said selected product combination, wherein said single elasticity is defined at said current price;

generating, by a computer, optimized price changes for said selected product combination and business segment using the price elasticity demand model and the win probability model, wherein the optimized price changes meet the defined pricing goals and constraints; and outputting the optimized price changes to a deal manager for deal negotiations.

6. A computer readable medium having executable instructions which when executing cause the operation on a computer the steps of:
  defining pricing goals and constraints;
  defining a selected business segment, wherein the selected business segment may be at least one of static and dynamic, and wherein the demand model module accesses a pre-defined segmentation library, selecting one or more appropriate pre-defined business segments from the pre-defined segmentation library, and combining the selected one or more appropriate pre-defined business segments to generate the selected business segment;
  defining a selected product combination;
  generating optimized price changes for said selected product combination and business segment; and
  providing the optimized price changes to a user for deal negotiations.

7. The computer readable medium having executable instructions as recited in claim 6 further comprising the steps of:
  selecting an existing customer;
  generating said optimized price changes for said selected product combination for said existing customer.

8. The computer readable medium having executable instructions as recited in claim 7 further wherein said elasticity range is an estimate.

9. The computer readable medium having executable instructions as recited in claim 8 further comprising the steps of:
  using said estimated elasticity to optimize price changes;
  analyzing the impact of the optimized price changes;
  adjusting optimized prices to be consistent with business goals; and
  setting adjusted prices as optimized prices.

* * * * *